United States Patent
O'Brien

(10) Patent No.: US 10,880,309 B2
(45) Date of Patent: *Dec. 29, 2020

(54) SECURE DOCUMENT STORAGE SYSTEM

(71) Applicant: RegDOX Solutions Inc., Nashua, NH (US)

(72) Inventor: William Lawrence O'Brien, Mont Vernon, NH (US)

(73) Assignee: RegDOX Solutions Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/508,868

(22) Filed: Jul. 11, 2019

(65) Prior Publication Data
US 2019/0334900 A1 Oct. 31, 2019

Related U.S. Application Data

(63) Continuation of application No. 15/223,461, filed on Jul. 29, 2016, now Pat. No. 10,389,716.
(Continued)

(51) Int. Cl.
*H04L 29/06* (2006.01)
*G06F 12/14* (2006.01)

(52) U.S. Cl.
CPC ...... *H04L 63/0892* (2013.01); *G06F 12/1408* (2013.01); *H04L 63/0272* (2013.01);
(Continued)

(58) Field of Classification Search
CPC . H04L 63/0892; H04L 63/102; H04L 63/101; H04L 63/08; H04L 63/0272;
(Continued)

(56) References Cited

U.S. PATENT DOCUMENTS 4,532,507 A 7/1985 Edson
5,907,598 A 5/1999 Mandalia
(Continued)

OTHER PUBLICATIONS

Office Action dated Jun. 26, 2020 for U.S. Appl. No. 16/508,901, 20 Pages.

*Primary Examiner* — Mahfuzur Rahman
(74) *Attorney, Agent, or Firm* — Maine Cernota & Rardin

(57) ABSTRACT

A system is provided for the storage of data, the system having: an encrypted host platform disposed in a specific territory and upon which export controlled data is stored; a controller configured to allow a primary user to set permission settings and identify authorized end users and degrees of access granted to each the authorized end user, the authorized end user being pre-cleared for compliance with export controls pertaining to the export controlled data; the controller configured to permit access to the encrypted host platform only if the host platform is located within a specific territory and if the hosting platform is in compliance with predefined data security protocols the controller configured to allow the authorized end user access to the export controlled data, and the controller configured to exclude access to both a provider of the system for storage and a system host platform provider; at least one individual computing device accessible by at least one the authorized end user, disposed within an authorized territory, the individual computing device configured to provide authorized end user identification data to the controller and receive permissions from the controller for access to the host platform; and the host platform only communicates with individual user devices if the devices have received permission from the controller.

18 Claims, 4 Drawing Sheets

Related U.S. Application Data

(60) Provisional application No. 62/282,266, filed on Jul. 29, 2015.

(52) U.S. Cl.
CPC ............ H04L 63/08 (2013.01); H04L 63/101 (2013.01); H04L 63/102 (2013.01); *G06F 2212/1052* (2013.01); *H04L 2463/082* (2013.01)

(58) Field of Classification Search
CPC ........... H04L 2463/082; G06F 12/1408; G06F 2212/1052
See application file for complete search history.

(56) References Cited

U.S. PATENT DOCUMENTS

| | | |
|---|---|---|
| 7,167,562 B2 | 1/2007 | Milgram |
| 2003/0229798 A1 | 12/2003 | Dastidar |
| 2004/0113768 A1 | 6/2004 | Rodgers |
| 2004/0230826 A1 | 11/2004 | Birkhoelzer |
| 2004/0232219 A1 | 11/2004 | Fowler |
| 2005/0272445 A1 | 12/2005 | Zellner |
| 2006/0041502 A1* | 2/2006 | Blair .................. G06Q 30/0641 705/37 |
| 2006/0282903 A1 | 12/2006 | Jung |
| 2007/0011446 A1 | 1/2007 | Kato |
| 2007/0066288 A1 | 3/2007 | Soelberg |
| 2007/0100701 A1 | 5/2007 | Boccon-Gibod |
| 2007/0139231 A1 | 6/2007 | Wallia |
| 2007/0220594 A1 | 9/2007 | Tulsyan |
| 2008/0022396 A1 | 1/2008 | Kado |
| 2008/0077530 A1 | 3/2008 | Banas |
| 2008/0222706 A1 | 9/2008 | Renaud |
| 2011/0302412 A1 | 12/2011 | Deng |
| 2012/0124637 A1 | 5/2012 | Dunaway |
| 2013/0159165 A1 | 6/2013 | Marlowe-Noren |
| 2013/0173484 A1 | 7/2013 | Wesby |
| 2014/0208112 A1 | 7/2014 | McDonald |
| 2014/0245451 A1 | 8/2014 | Le Sant |
| 2016/0344740 A1 | 11/2016 | Choi |

* cited by examiner

SECURE DOCUMENT STORAGE SYSTEM

RELATED APPLICATIONS

This application is a continuation of U.S. application Ser. No. 15/223,461 filed on Jul. 29, 2016, which claims the benefit of U.S. Provisional Application No. 62/282,266, filed Jul. 29, 2015. These applications are herein incorporated by reference in their entirety for all purposes.

FIELD OF THE INVENTION

The invention relates to cloud storage solutions, and more particularly, to a cloud storage solution with integrated security protocols to prevent unauthorized exportation of sensitive technical data.

BACKGROUND OF THE INVENTION

Technical data relating to munitions and other war material generated in the United States must be handled in compliance with International Traffic in Arms Regulations (ITAR) issued by the Directorate of Defense Trade Controls (DDTC) of the US State Department. Increasingly, companies are reliant on cloud and other electronic document handling systems for the management of technical data. This is problematic in relation to ITAR regulated data for a number of reasons. It is generally recognized that commercially available public cloud document and file storage, management and collaboration systems contain a comprehensive range of features and enterprise quality security that are impractical if not impossible to design, implement and maintain by any single enterprise or organization for its own documents and purposes. Some commercially available pubic cloud systems merely contain features and functions that reflect a rich and leveraged history of solving a multitude of needs and concerns with regard to the storage, management and collaboration of documents and files, but also they are continually enhanced to incorporate the best available security and updated features at competitively maintained prices. These commercial offerings are consistently greater in function and far less in cost than those of companies not competing in this industry can achieve through their own individual efforts.

Unfortunately, these "best of breed" public cloud storage, management and collaboration solutions, as well as the specific functionality incorporated within these solutions, some of which could enhance compliance with export laws and the administration and reporting of export licenses and technical assistance agreements granted for the export of ITAR-defined technical data, have not been available for use where documents and files contain ITAR-defined technical data. The very features of shared platforms, cloud disbursement of data, and ubiquity (and therefore anonymity) of access that have been viewed as positive attributes of cloud solutions generally have been viewed instead as antithetical to the ITAR. Use of these resources has been judged as automatically resulting in what the ITAR categorizes as "deemed exports," that is impermissible exports that will be deemed to have occurred because the possessor of export-controlled technical data did not take reasonable steps to preclude such occurrence.

As a consequence of the unavailability to those possessing documents with ITAR-defined technical data of leading public cloud document and file storage, management and collaboration subscription solutions, those possessing such technical data have been forced to implement various, inadequate alternatives. Some have avoided any electronic storage of ITAR-defined technical data, maintaining only "paper" copies of documents and materials containing such data. Others have maintained electronic copies, but have done so often in non-encrypted formats and hoped that through stealth and luck those documents and files would not be disseminated in violation of the ITAR.

Still other enterprises and organizations have attempted to implement and maintain "dark clouds," which are private computer networks that attempt to capture some of the security, efficiencies and functionality of the best commercial offerings. Such offerings, however, have a substantially greater cost and significantly less functionality and security than could be available in the market from commercial providers if not for the "ITAR" prohibition.

Deficiencies in known systems indicate that: (1) there would be substantial cost savings, enhanced security, and less administrative burden if companies dealing with documents and files containing ITAR-defined technical data could collaborate in the use of those documents and files via common cloud computing practices that are widely recognized at the enterprise level as "best-in-class" to foster high productivity, performance and regulatory compliance; (2) encryption and use restrictions alone are not sufficient to achieve ITAR compliance when using cloud solutions; and (3) the cost of non-compliance, and therefore the lack of a solution to the unavailability of a leading commercial document and file collaboration solution, is high.

Accordingly, there exists a need for a fully functional, public cloud-based document and file storage, management and collaboration system for documents and files containing ITAR-defined technical data.

SUMMARY OF THE INVENTION

One embodiment of the present invention provides a system for the storage of data, the system comprising: an encrypted host platform disposed in a specific territory and upon which export controlled data is stored; a controller configured to allow a primary user to set permission settings and identify authorized end users and degrees of access granted to each the authorized end user, the authorized end user being pre-cleared for compliance with export controls pertaining to the export controlled data; the controller configured to permit access to the encrypted host platform only if the host platform is located within a specific territory and if the hosting platform is in compliance with predefined data security protocols the controller configured to allow the authorized end user access to the export controlled data, and the controller configured to exclude access to both a provider of the system for storage and a system host platform provider; at least one individual computing device accessible by at least one the authorized end user, disposed within an authorized territory, the individual computing device configured to provide authorized end user identification data to the controller and receive permissions from the controller for access to the host platform; and the host platform only communicates with individual user devices if the devices have received permission from the controller.

Another embodiment of the present invention provides a such a system wherein the controller compiles logs of all actions on the system relating to controlled technical data disposed on the host platform.

A further embodiment of the present invention provides a such a system wherein the audit trails are tamperproof.

Yet another embodiment of the present invention provides a such a system wherein the controller is configured to provide real-time reports to an enterprise administrator of access points granted to controlled technical data disposed on the host platform.

A yet further embodiment of the present invention provides a such a system wherein the real-time reports provide automated alerts to the enterprise administrator.

Still another embodiment of the present invention provides a such a system wherein the controller is configured to require two-factor authentication of individual computing devices.

A still further embodiment of the present invention provides a such a system wherein the controller provided granular permissions to the individual computing devices.

Even another embodiment of the present invention provides a such a system further comprising an encrypted email service disposed on the encrypted host platform.

An even further embodiment of the present invention provides a such a system wherein hardware specifications of an authorized user are determined on initial authorization and further access by the authorized user is limited to the specific hardware configuration used for the initial authorization.

Yet still another embodiment of the present invention provides a such a system wherein hardware specifications comprise information regarding the CPU, BIOS, motherboard, and operating system.

A yet still further embodiment of the present invention provides a such a system wherein access by an authorized user from a different hardware configuration than that used for initial authorization would result in the user being prompted for additional information.

Yet even another embodiment of the present invention provides a such a system wherein the additional information comprises information provided through two-factor authentication or two-channel authentication.

A yet even further embodiment of the present invention provides a such a system further comprising a master key configured to allow secondary access to the system.

Even yet another embodiment of the present invention provides a such a system wherein the master key is split into a plurality of files, all of which must be combined to allow access to the system.

An even yet further embodiment of the present invention provides a such a system wherein the plurality of master keys are held by citizens of the territory in which the hosting platform is located.

Still yet another embodiment of the present invention provides a such a system wherein the controller provides access to the system only to citizens and permanent residents of the specific territory.

A still yet further embodiment of the present invention provides a such a system wherein the system is accessible via distributed computer network located entirely within the specific territory.

Still even another embodiment of the present invention provides a such a system wherein the specific territory is the United States of America.

A still even yet further embodiment of the present invention provides a such a system further comprising a reporting module, configured to electronically record and report transmittal of the controlled data outside of the specific territory.

Another embodiment of the present invention provides a such a system wherein the specific territory and the authorized territory are the same.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
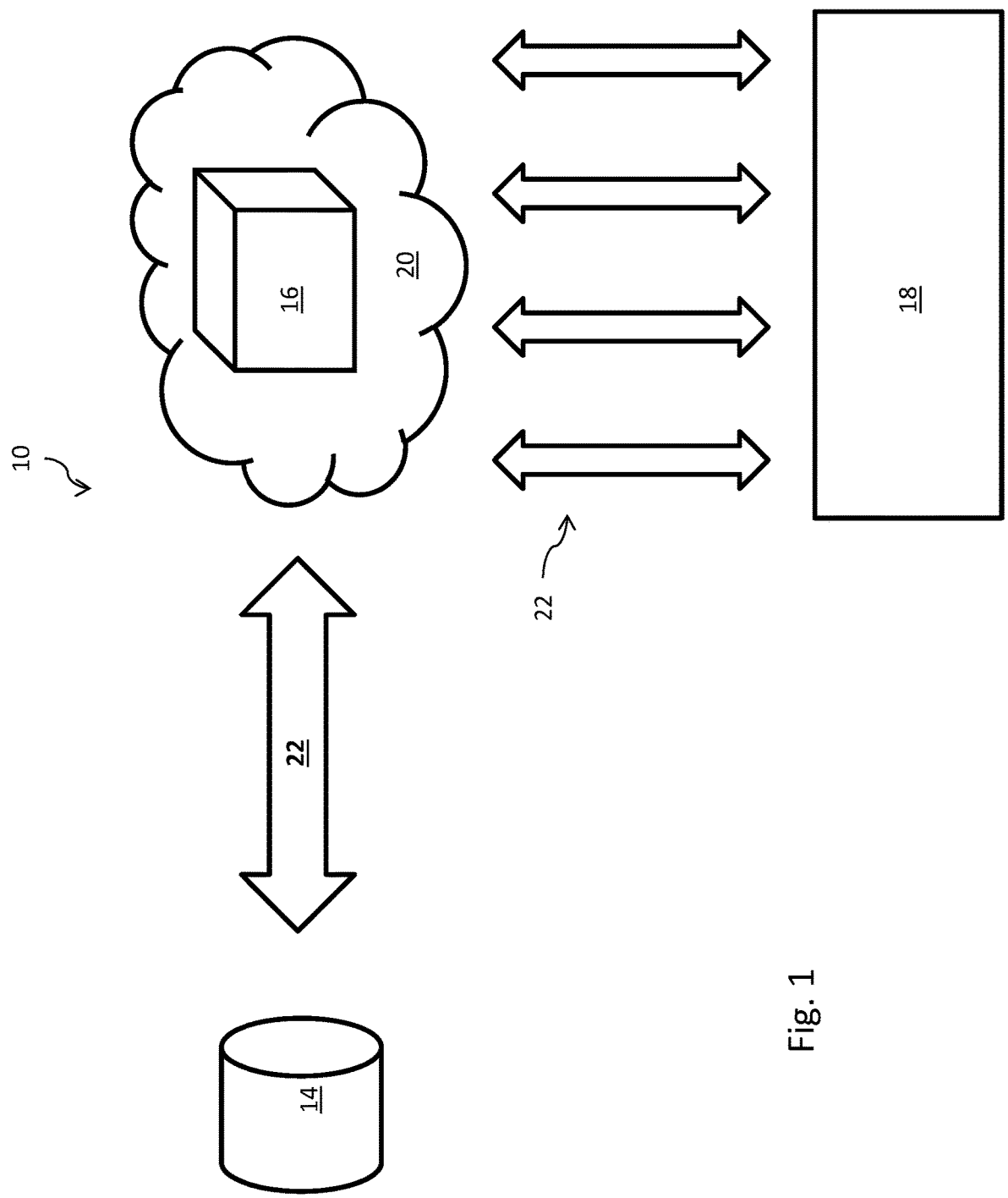
FIG. 1 is a block diagram illustrating a Secure Document Storage System configured in accordance with one embodiment of the present invention.

As illustrated in FIG. 1, one embodiment of the present invention is provided. FIG. 1 depicts a document and file storage, management, and collaboration ITAR-compliant hosting platform 16 within a third party hosting platform 20, both of which platforms are physically located on servers or similar devices, which are located within the territory of the United States of America and serviced and maintained by United States citizens or persons in the United States legally ("US persons"). Some embodiments of the present invention may be configured for storage and communication of classified data as well as controlled data. Furthermore, all installation, support, ongoing maintenance and system upgrade activities of the ITAR Hosting Platform 16 and its cloud computing environment is performed exclusively by US persons who are employed by US employers and supervised by other US persons. This control may part of the implementation of the system according to one embodiment of the present invention and, consequently, dictates how data (customer content) is handled by the application provider and the hosting platform provider. In such a system, the ITAR-compliant hosting platform 16 may receive certificates from the application provider and the hosting platform provider confirming compliance, and/or may track IP addresses and other geographic indicia to monitor host location and access points. In some embodiments, confirmation of user nationality and geographic location could be automated to track transmission of data, verify user URL, employee privacy makes citizenship problematic; periodically check names and information Such embodiments could provide individual lists with training support maintenance consulting and third party certification that no names are on a preclusion list. Alternatively, they could provide access to a preclusion list to the customer to allow them to vet their own users.

Such a platform 16 may be configured with software, firmware, or hardware that prevents unauthorized access of technical data by IT staff and platform providers. Users of a system configured according with one embodiment of the present invention would be assured by the system that neither the application provider not the hosting provider will violate the US persons/locale requirement; this also means that, through use by customers of the user and document permissions features that control access, use, movement, etc. of both users and documents, the customer can ensure that non-US Persons do not have non-regulatory compliant access or possible access to documents containing controlled technical data.

Embodiments of the present disclosure may identify the hardware associated with an authorized user. Hardware identification may comprise the identification of one or more hardware components of an authorized user's system, including the CPU, bios and motherboard and may vary from specific identification to identification of general characteristics of such hardware. A change in the hardware configuration of an authorized user may, in embodiments, be used to prevent the user's access to the encrypted data, trigger an alert or prompt the user to authorize the new configuration for access. Two-factor authentication, single use pins, two-channel authentication or other enhanced-security measures, as would be known to those of ordinary skill in the art, may be used to reauthorize a changed hardware configuration in some embodiments.

Controlled technical data may only be accessed by such US persons or persons permitted by a federal government issued export license or approved technical assistance agreement. The system according to one embodiment of the present invention, controls for this in two ways:

1. Through the implementation of the application provider and hosting provider controls described above with regard to US hosting local; US Persons; US transit of documents containing ITAR-defined technical data; and
2. Through user and document restrictions (also referred to as permissions) that the customer can place on both users and documents, the customer can ensure its users that those documents are not accessible, are not used, and are not moved except in compliance with US export documents, such as an Export License, a Technical Assistance Agreement (TAA), or a Master License Agreement (MLA).

The ITAR Hosting Platform 16 referenced in FIG. 1 maintains ITAR-defined technical data in encrypted format. In various embodiments of the present invention, encryption may be Encryption at rest (stored content): 256 bit AES encryption (Rijndael algorithm) Encryption in transit: up to 256 bit SSL encryption (https transfer). The encryption of documents stored on the system configured according to one embodiment of the present invention, ensures compliance with TLS standard 1.0. (Transport Layer Security (TLS) is a protocol that provides privacy and data integrity between two communicating applications. It's the most widely deployed security protocol used today, and is used for Web browsers and other applications that require data to be securely exchanged over a network, such as file transfers, VPN connections, instant messaging and voice over IP).

Embodiments of the present disclosure may also provide multilevel key management. Such embodiments may utilize a unique dataroom key, which may be generated during creation of a dataroom, which, in embodiments, may be synonymous with the secure viewer discussed elsewhere in the present disclosure. In other embodiments, a dataroom may be used herein to refer, generally, to the secure connection between a host platform and an authorized user. Such a dataroom key may be used to encrypt documents and be itself stored in an encrypted file system. The dataroom key may be further encrypted with a master key, which, in embodiments, is split into multiple parts, without all of which the information encrypted therewith may not be decrypted. Such a master key may be distributed between several persons to provide enhanced security. In embodiments, where a specific citizenship may be required for access to the underlying data, the persons having portions of the master key may all be of a uniform citizenship of the type required for authorized access. In other embodiments, the master key holders may be senior officials of the hosting platform organization.

Encryption implements a Multilevel Encryption Key Management, as follows:

1. Unique data room-key which is generated when the data room is created
2. Documents are encrypted with the applicable data room key and stored in file system (256 bit AES encryption)
3. The data room key is encrypted with the system master key
4. The master key is generated during installation of the customer's data room center that allows for the creation of one or a multitude of data rooms.

FIG. 1 further illustrates ITAR-defined technical data 22 being transmitted in encrypted format between a secured private database 14, such as might be maintained by private or governmental organization, to the ITAR Hosting Platform. It should be understood that the embodiments of the present invention may be deployed on various database platforms and are not limited to specific database architectures.

In the embodiment illustrated in FIG. 1, individual Computing devices 18 controlled by users are permitted by the enterprise or organization, as defined in a controller 12 that controls the secured private database 14, to access the technical data in the Hosting Platform 16 and thereby receive controlled technical data from, and transmit controlled technical data to, the ITAR-compliant Hosting Platform 16 in encrypted form and in compliance with the established rules.

Figure 2:
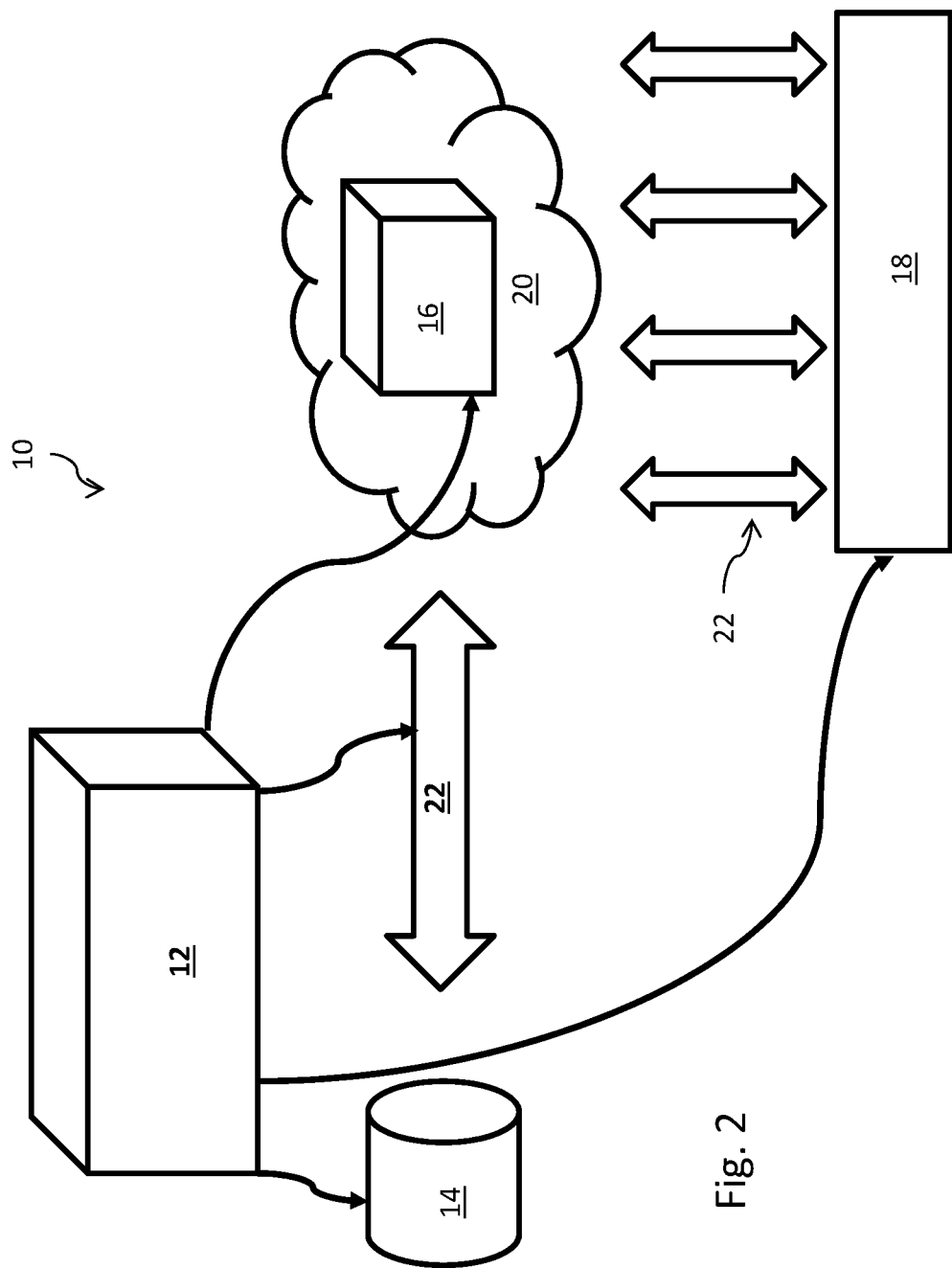
FIG. 2 is a block diagram illustrating a secure document storage system with an enterprise controller configured in accordance with one embodiment of the present invention.

As illustrated in FIG. 2, an enterprise controlling the secured private database configured according to one embodiment of the present invention controls the transmission of controlled technical data to and from the Controlled Hosting Platform from that secured private database and its permitted users (those using individual computing devices), as well as by controlling who will be, and who will continue as a permitted user).

Figure 3:
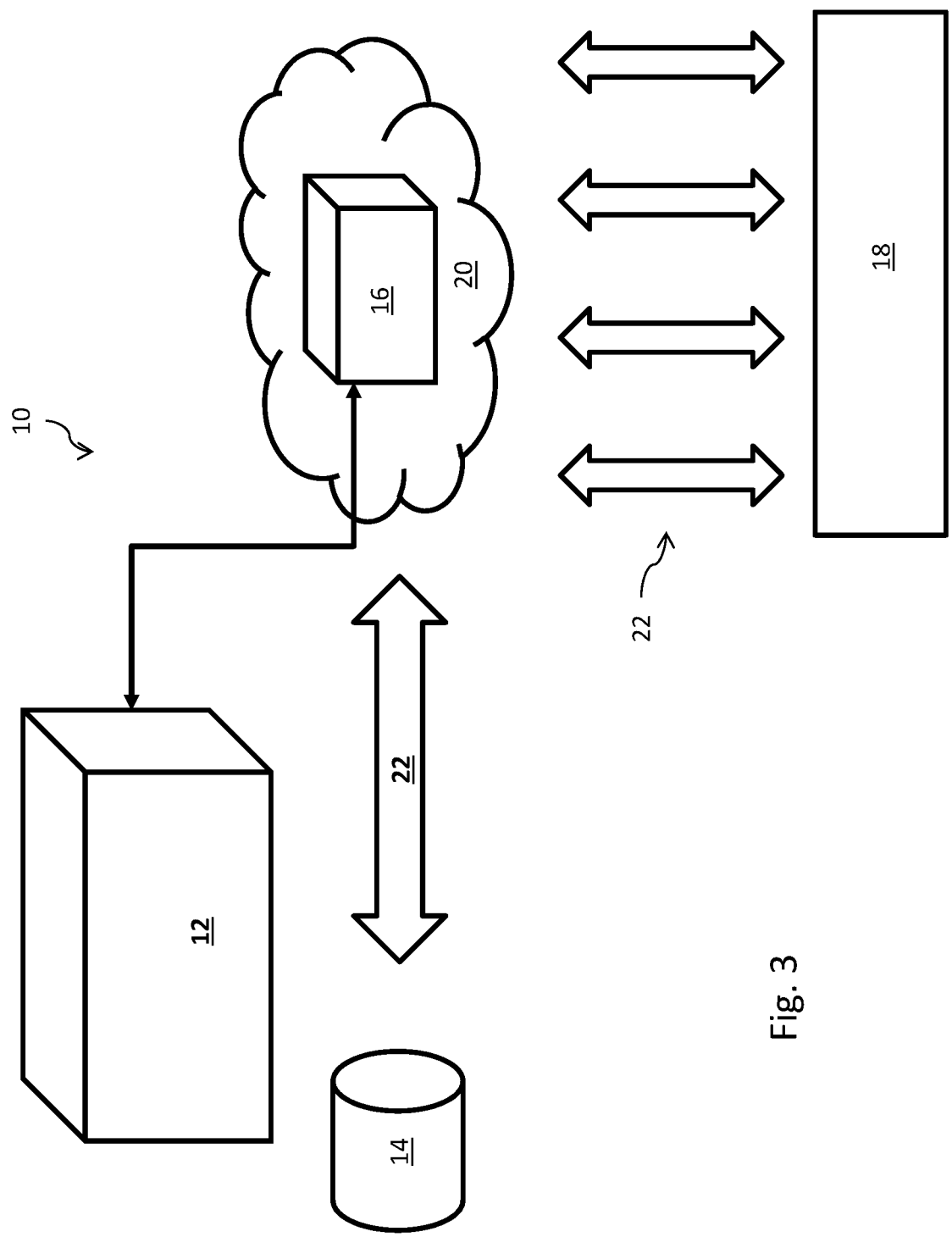
FIG. 3 is a block diagram illustrating a secure document storage system with an enterprise controller and tamper proof auditing and on request reporting configured in accordance with one embodiment of the present invention.

As illustrated in FIG. 3, a system 10 configured according to one embodiment of the present invention is provided for cloud based controlled file storage with tamper proofing and auto reporting functionalities. In the system, an enterprise controller 12 controls individual access 18, a database 14, and an ITAR Platform 16. The controller 12 provides tamper proof auditing of ITAR hosting platform 16. This tamper proofing is a result of limitations on the system such that the system is not accessible for editing or elimination by a customer. In embodiments, customers are not allowed access to that portion of the application that could be used to edit or eliminate information on users, documents and events in the use of the document. Encrypted technical data 22 is transferred between the ITAR-compliant hosting platform 16 and technical data secure database 14. Individual computing devices 18, which may include but are not limited to personal computers, workstations, mobile phones, tablets, smart watches, or similar devices, may, subject to permissions granted by the controller 12, access the ITAR-compliant Hosting Platform 16 and access ITAR data from it securely.

Figure 4:
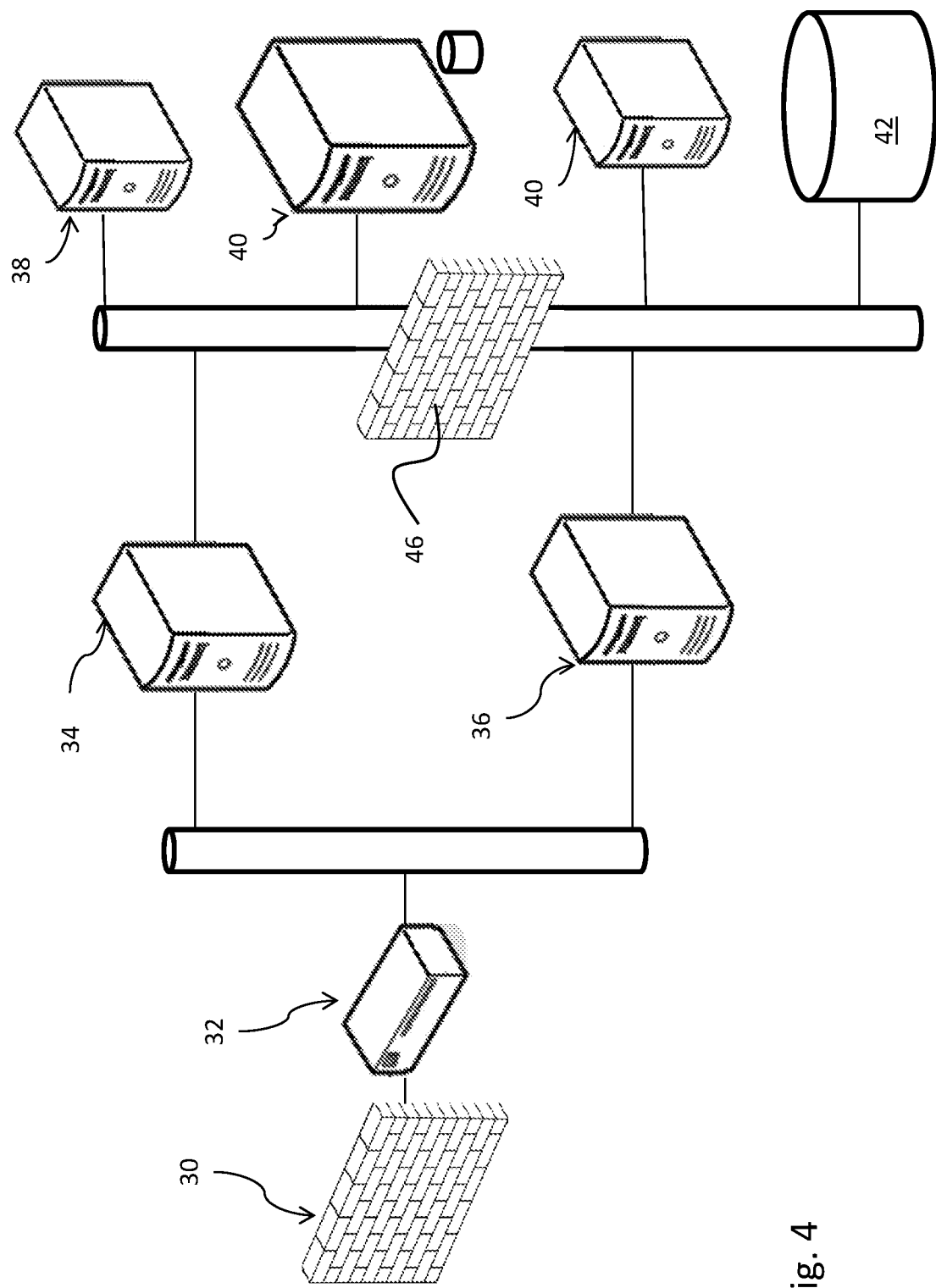
FIG. 4 is a block diagram illustrating a the system architecture of a secure document storage system configured in accordance with one embodiment of the present invention.

As illustrated in FIG. 4, a host platform architecture may be provided comprising a firewall 30, a load balancer 32, dual application servers 34,36, dual AD-Controllers 38,40, a Network Attached Storage Device 42 and a Database server 44. A second firewall 46 may also be disposed between the application severs 34,36 and the AD-Controllers 38,40, Database Server 44, and Network attached storage 42. Those of ordinary skill in the art would be aware of other configurations that would provide comparable security and access.

In one embodiment of the present invention, technical information is provided to a user on an individual computing device via a secure viewer. One such viewer is described in U.S. Pat. No. 7,865,827, which is incorporated by reference herein in its entirety for all purposes. Such a viewer allows the user to review documents, but not download them or store them locally. Similarly, displayed documents may have integrated watermark features, either visible to the user or occult. Watermarks may be dynamic, in that they may change during the course of viewing so as to embed user, time, location, device, and other data, so as to provide evidence in case of breach. Furthermore, the system is configured to trace each action and provide documentation to auditors or enterprise administrators. As the view interactacts with the controller, the controller is able to compartmentalize technical data and permissions in a highly granular way, facilitating permissions for specific tasks, documents, document viewing, and document storage. These use restrictions are chosen by the subscriber to the service with regards to individual users, user groups, datarooms, dataroom centers, and documents and files within and comprising such technical data. Such a system may be configured with an encoded email or similar messaging system.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for the storage of data, the system comprising:
   an encrypted host platform disposed in a specific territory and upon which export controlled data is stored;
   a controller configured to allow a primary user to set permission settings and identify authorized end users and degrees of access granted to each said authorized end user, said authorized end user being pre-cleared for compliance with export controls pertaining to said export controlled data; said controller configured to permit access to said encrypted host platform only if said host platform is located within said specific territory and said hosting platform is in compliance with predefined data security protocols, said controller being further configured to allow said authorized end user access to said export controlled data in accordance with said permission settings and degrees of access granted thereto, and said controller configured to exclude access to both a provider of the system for storage and a system host platform provider; and
   at least one individual computing device accessible by at least one said authorized end user, disposed within an authorized territory, said individual computing device configured to provide authorized end user identification data to said controller and receive permissions from said controller for access to said host platform;
   wherein said host platform only communicates with individual user devices if said devices have received permission from said controller;
   wherein said controller is configured to provide real-time reports to an enterprise administrator of access points granted to controlled technical data disposed on said host platform;
   wherein said real-time reports provide automated alerts to said enterprise administrator.

2. The system of claim 1 wherein said controller compiles logs of all actions on said system relating to controlled technical data disposed on said host platform.

3. The system of claim 2 wherein said logs are tamper-proof.

4. The system of claim 1 wherein said controller is configured to require two-factor authentication of individual computing devices.

5. The system of claim 1 wherein said controller provided granular permissions to said individual computing devices.

6. The system of claim 1 further comprising an encrypted email service disposed on said encrypted host platform.

7. The system of claim 1 wherein hardware specifications of an authorized user are determined on initial authorization and further access by said authorized user is limited to the specific hardware configuration used for said initial authorization.

8. The system of claim 7 wherein hardware specifications comprise information regarding the CPU, BIOS, motherboard, and operating system.

9. The system of claim 7 wherein access by an authorized user from a different hardware configuration than that used for initial authorization would result in the user being prompted for additional information.

10. The system of claim 8 wherein said additional information comprises information provided through two-factor authentication or two-channel authentication.

11. The system of claim 1 further comprising a master key configured to allow secondary access to the system.

12. The system of claim 11 wherein said master key is split into a plurality of files, all of which must be combined to allow access to the system.

13. The system of claim 12 wherein individual files from said plurality of files are held by citizens of the territory in which the hosting platform is located.

14. The system of claim 1 wherein said controller provides access to said system only to citizens and permanent residents of said specific territory.

15. The system of claim 1 wherein said system is accessible via distributed computer network located entirely within said specific territory.

16. The system of claim 1 wherein said specific territory is the United States of America.

17. The system of claim 1 further comprising a reporting module, configured to electronically record and report transmittal of said controlled data outside of said specific territory.

18. The system according to claim 1 wherein said specific territory and said authorized territory are the same.

* * * * *